(12) United States Patent
Yokoi et al.

(10) Patent No.: US 12,031,675 B2
(45) Date of Patent: Jul. 9, 2024

(54) HIGH-PRESSURE TANK

(71) Applicants: TOYODA GOSEI CO., LTD., Kiyosu (JP); TOYOTA JIDOSHA KABUSHIKI KAISHA, Toyota (JP)

(72) Inventors: Takaaki Yokoi, Kiyosu (JP); Masayoshi Takami, Hamamatsu (JP)

(73) Assignees: TOYODA GOSEI CO., LTD., Aichi-pref. (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 72 days.

(21) Appl. No.: 17/974,691

(22) Filed: Oct. 27, 2022

(65) Prior Publication Data
US 2023/0134258 A1   May 4, 2023

(30) Foreign Application Priority Data
Oct. 29, 2021   (JP) .................... 2021-177266

(51) Int. Cl.
*F17C 1/02*   (2006.01)
*F17C 13/06*   (2006.01)

(52) U.S. Cl.
CPC ............. *F17C 1/02* (2013.01); *F17C 13/06* (2013.01); *F17C 2201/0109* (2013.01); *F17C 2203/0604* (2013.01)

(58) Field of Classification Search
CPC .... F17C 1/02; F17C 13/06; F17C 1/08; F17C 2203/0604; F17C 2201/0109
USPC .......... 220/589, 586, 590, 592, 581
See application file for complete search history.

(56) References Cited

U.S. PATENT DOCUMENTS

| | | | | |
|---|---|---|---|---|
| 8,967,417 B2* | 3/2015 | Sharp | ........ | F17C 1/16 220/240 |
| 2011/0220659 A1* | 9/2011 | Strack | ........ | F17C 1/16 220/586 |
| 2014/0061207 A1* | 3/2014 | Kloft | ........ | F17C 1/08 220/586 |
| 2014/0312043 A1* | 10/2014 | Sejima | ........ | F17C 1/16 220/586 |

(Continued)

FOREIGN PATENT DOCUMENTS

| | | |
|---|---|---|
| JP | H07-158797 A | 6/1995 |
| JP | H08-219389 A | 8/1996 |
| JP | 2017-129156 A | 7/2017 |

(Continued)

OTHER PUBLICATIONS

Office Action dated Oct. 10, 2023 issued in corresponding Japanese Patent Application No. 2021-177266 (and English machine translation).

*Primary Examiner* — Rafael A Ortiz
(74) *Attorney, Agent, or Firm* — Posz Law Group, PLC

(57) ABSTRACT

A high-pressure tank includes: a liner having a hollow liner body, a metal cap, a sealing member, and a reinforcing portion. The hollow liner body has an opening in an end portion in an axial direction, and a tubular insert ring harder than the liner body and integrated with the liner body to surround the opening. The metal cap is inserted into the opening. The sealing member seals between the insert ring and the metal cap. The reinforcing portion covers an outer side of the liner, and the insert ring extends to a front side in the axial direction with respect to the liner body and is mounted on the metal cap.

4 Claims, 3 Drawing Sheets

(56) References Cited

U.S. PATENT DOCUMENTS

2019/0257473 A1\* 8/2019 Kanezaki ................. F17C 1/02

FOREIGN PATENT DOCUMENTS

| JP | 2020-076490 A | | 5/2020 |
|---|---|---|---|
| JP | 2020076490 A | \* | 5/2020 |

\* cited by examiner

HIGH-PRESSURE TANK

TECHNICAL FIELD

The present invention relates to a high-pressure tank capable of containing a liquid or a gas under high pressure.

BACKGROUND ART

As a high-pressure tank capable of containing a liquid or a gas under high pressure, for example, a fuel tank for containing fuel such as hydrogen gas has been known (see, for example, JP2020-76490 (A)).

The high-pressure tank introduced in JP2020-76490 (A) includes a liner which forms a space for sealing a gas, a metal cap which is mounted in a through hole formed at each end in the longitudinal direction of the liner, and a fitting member which is formed from a material different from that of the metal cap and is disposed between the liner and the metal cap to seal between the liner and the metal cap. In addition, the liner of the high-pressure tank of JP2020-76490 (A) has, at a top-side inner wall of a dome portion at each end in the longitudinal direction thereof, an insert ring in which the through hole is formed and which is in airtight contact with the fitting member. The insert ring has a tubular through hole-forming portion which forms the through hole, and an extended pressure-receiving portion which has an extended shape continuously extended from the through hole-forming portion, is recessed at the top-side inner wall of the dome portion, and receives a tank internal pressure applied along the longitudinal direction.

JP2020-76490 (A) states that the insert ring in the high-pressure tank has a function of receiving the tank internal pressure.

SUMMARY OF INVENTION

Technical Problem

Since a liquid or a gas is contained under high pressure in the high-pressure tank, a large internal pressure is applied particularly to the liner of the high-pressure tank. In addition, the volume of the liquid or the gas contained in the high-pressure tank increases as the temperature rises. Therefore, the internal pressure applied to the liner changes as the temperature of the environment in which the high-pressure tank is located changes. In particular, the portion of the liner other than the insert ring (referred to as liner body) expands and contracts repeatedly as the internal pressure changes. This repeated expansion and contraction of the liner body is considered to significantly affect the durability of the high-pressure tank.

Here, in a general high-pressure tank, expansion of a liner is suppressed by covering the outer peripheral side of the liner with a high-strength reinforcing portion. However, even in such a high-pressure tank, a change in the internal pressure applied to the liner by a liquid or a gas cannot be suppressed. Therefore, development of a technology that achieves improvement of the durability of a high-pressure tank is desired.

The present invention has been made in view of such circumstances, and an object of the present invention is to provide a technology that achieves improvement of the durability of a high-pressure tank.

Solution to Problem

A high-pressure tank according to the present invention which solves the above problem is a high-pressure tank including:

a liner having a hollow liner body having an opening in an end portion in an axial direction, and a tubular insert ring harder than the liner body and integrated with the liner body to surround the opening;

a metal cap inserted into the opening;

a sealing member sealing between an opening peripheral portion of the liner and the metal cap; and a reinforcing portion covering an outer side of the liner, wherein the insert ring extends to a front side in the axial direction with respect to the liner body and is mounted on the metal cap.

Advantageous Effects of Invention

According to the present invention, improvement of the durability of the high-pressure tank is achieved.

DESCRIPTION OF EMBODIMENTS

Figure 1:
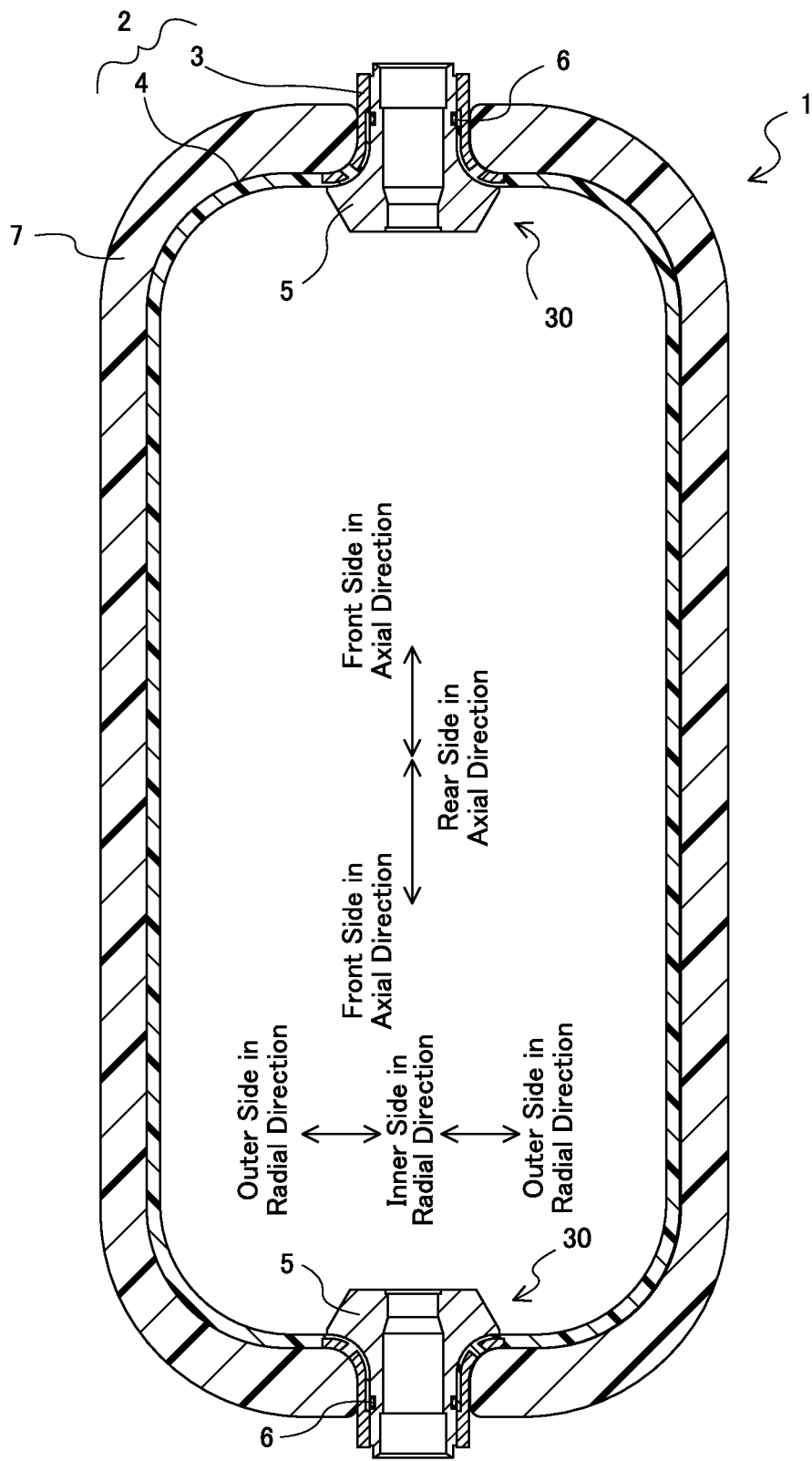
FIG. 1 schematically illustrates a cross-sectional view of a high-pressure tank according to a first embodiment taken along an axial direction thereof.

The following describes embodiments of the present invention. Unless otherwise mentioned in particular, a numerical value range of "a to b" described in the present specification includes, in the range thereof, a lower limit "a" and an upper limit "b". A numerical value range may be formed by arbitrarily combining h upper limit values, lower limit values, and numerical values described in embodiments and the like. In addition, numerical values arbitrarily selected within a numerical value range may be used as upper limit and lower limit numerical values.

As described above, the high-pressure tank according to the present invention is a high-pressure tank including:

a liner having a hollow liner body having an opening in an end portion in an axial direction, and a tubular insert ring harder than the liner body and integrated with the liner body to surround the opening;

a metal cap inserted into the opening;

a sealing member sealing between an opening peripheral portion of the liner and the metal cap; and a reinforcing portion covering an outer side of the liner, wherein the insert ring extends to a front side in the axial direction with respect to the liner body and is mounted on the metal cap.

The inventor of the present invention has conducted thorough research in order to improve the durability of a high-pressure tank. As a result, the inventor of the present invention has obtained the idea that damage to the liner body caused when the internal pressure of the high-pressure tank changes and the liner body expands or contracts is a factor for deterioration of the durability of the high-pressure tank.

Specifically, when the liner body expands or contracts, the position of the liner body changes relative to the insert ring and the metal cap, and the liner body rubs against the insert ring and the metal cap. The metal cap and the insert ring are harder than the liner body. Thus, when the liner body repeatedly expands and contracts and repeatedly rubs against the metal cap and the insert ring, damage to the liner body may occur, resulting in deterioration of the durability of the liner body, which in turn may cause deterioration of the durability of the high-pressure tank.

For example, in the case where the high-pressure tank is a fuel tank, the temperature of the environment around the high-pressure tank may rise during fuel combustion, and the temperature of the liner body may rise.

Generally, resin materials such as polyamide and polyethylene are used as the material of the liner body. Therefore, the liner body easily softens as the temperature thereof rises. If the liner body softens as the temperature thereof rises, and the internal pressure of the high-pressure tank is high, the liner body tends to flow toward the outside of the high-pressure tank.

As described above, the outer peripheral side of the high-pressure tank is reinforced by the reinforcing portion. Therefore, at that time, the liner body tends to flow toward where there is no reinforcing portion, that is, toward the axial direction.

Here, the insert ring is disposed at an end portion in the axial direction of the liner of the high-pressure tank. Therefore, a force in the axial direction is applied to the insert ring by the flowing liner body. If this force is excessively large, the position of the insert ring changes relative to the liner body and the metal cap. In this case, damage to the liner body may occur, which may cause deterioration of the durability of the high-pressure tank.

In contrast, the insert ring of the high-pressure tank according to the present invention extends to the front side in the axial direction with respect to the liner body. Therefore, for example, the liner body that has deformed under high temperature and high pressure and has flowed toward the front side in the axial direction is blocked by the portion, of the insert ring, which exists on the front side in the axial direction with respect to the liner body. In other words, excessive deformation and position change of the liner body toward the front side in the axial direction is restricted by the insert ring. Hereinafter, if necessary, the "portion, of the insert ring, which exists on the front side in the axial direction with respect to the liner body" is sometimes referred to as front side restriction end portion.

The axial direction of the liner body described above coincides with the axial directions of the insert ring and the metal cap. Therefore, in the present specification, unless otherwise specified, the axial direction of the liner body, the axial direction of the insert ring, and the axial direction of the metal cap are collectively referred to simply as axial direction. The same applies to a radial direction and a circumferential direction.

In the high-pressure tank according to the present invention, a change in the position of the insert ring itself is suppressed by mounting the insert ring on the metal cap. Therefore, for example, when the liner body deforms and flows under high temperature and high pressure as described above, even if a force toward the front side in the axial direction is applied to the insert ring due to the flow of the liner body, deformation and breakage of the entire liner caused by a change in the position of the insert ring itself is also suppressed.

In the high-pressure tank according to the present invention, owing to cooperation of these factors, deformation and breakage of the liner itself, including the liner body, and deterioration of the durability of the high-pressure tank due to the deformation and breakage of the liner are suppressed. That is, according to the present invention, the durability of the high-pressure tank is improved.

Hereinafter, the high-pressure tank according to the present invention is described for each component thereof.

The high-pressure tank according to the present invention includes a liner, a metal cap, a sealing member, and a reinforcing portion.

The liner has a liner body and an insert ring.

The liner body is a hollow member having an opening in an end portion in the axial direction thereof. The liner body functions as a containing portion for containing a gas or a liquid therein. Hereinafter, if necessary, the liquid or the gas contained in the high-pressure tank is sometimes collectively referred to as high-pressure fluid.

As the material of the liner body for containing the high-pressure fluid, a material that is capable of expanding and contracting so as to follow expansion and contraction of the high-pressure tank and that is not permeable to the high-pressure fluid contained in the high-pressure tank or has low permeability to the high-pressure fluid may be appropriately selected. For example, in the case where the high-pressure tank is a hydrogen tank for containing hydrogen as a high-pressure fluid, examples of suitable materials for the liner body include nylon 6 (polyamide), etc., which has low hydrogen permeability.

The liner body may have a single-layer structure or may have a multilayer structure with two or more layers. If the liner body has a multilayer structure, the materials forming the respective layers may be the same or different from each other.

The liner body is hollow and has an opening in the end portion in the axial direction as described above, and may have a shape that allows the liner body to withstand the internal pressure derived from the high-pressure fluid contained therein. The liner body may have an opening in only one end portion in the axial direction, or may have an opening in each of both end portions in the axial direction. In the case where the liner body has an opening in each of both end portions in the axial direction, one insert ring is integrated into each opening, and one metal cap is mounted in each opening.

In the present specification, the center side in the axial direction of the liner body is defined as a rear side in the axial direction, and the opening side in the axial direction of the liner body is defined as a front side in the axial direction.

More specifically, the liner body has a bottomed or bottomless tubular shape, and a radial cross-section of the liner body, that is, a cross-section of the liner body in a direction orthogonal to the axial direction, preferably has a perfect circle shape, a regular polygon shape, or a shape similar thereto.

Each front end portion in the axial direction of the liner body preferably has a dome shape so as to be capable of withstanding the internal pressure of the high-pressure fluid. The dome shape means a shape having a diameter increasing from the front side toward the rear side in the axial direction, in other words, a shape having a diameter decreasing from the rear side toward the front side in the axial direction. Hereinafter, if necessary, a portion, of the liner body, which is each front end portion in the axial direction and forms a dome shape is sometimes referred to as dome portion.

The surface of the dome portion preferably has a curved shape or a polyhedral shape. In the case where the surface of the dome portion has a curved shape, the curvature of the dome portion is particularly preferably constant or substantially constant.

The insert ring is a tubular member that is harder than the liner body and is integrated with the liner body to surround the opening of the liner body.

Similar to the liner body, the insert ring is a member that comes into contact with the high-pressure fluid. Therefore, as the material of the insert ring, a material that is not permeable to the high-pressure fluid or has low permeability to the high-pressure fluid may be appropriately selected. In addition, for the insert ring, a material that is harder than the liner body may be selected, and the hardness thereof may be measured by the Rockwell hardness measurement method according to JIS Z 2245 or ISO 2039-2.

The insert ring is required to have a hardness and strength sufficient to block the liner body that tends to flow and allow the insert ring to be mounted on the metal cap. Specific examples of suitable materials for such an insert ring include metals typified by aluminum and SUS316L which is a type of stainless steel. Other suitable materials to be used include resin materials having excellent strength and heat resistance and referred to as engineering plastic or super engineering plastic typified by polyamide and polyimide.

The insert ring and the liner body may be integrated by any method. Specific examples of a method for integrating the insert ring and the liner body include methods such as adhesion, welding, or integral molding, but selecting integral molding such as an insert molding method and a two-color molding method is reasonable.

The insert ring may surround the opening of the liner body, and may be disposed radially outward of the opening, or may form a part of the opening together with the liner body. As described above, each end portion in the axial direction of the insert ring has the function of blocking the liner body, and thus, at the front side restriction end portion, the insert ring is preferably flush with the opening of the liner body or extends to the inner side in the radial direction with respect to the opening.

In order to firmly integrate the insert ring and the liner body, preferably, the insert ring has an anchor hole having a through hole shape, and a part of the liner body enters the anchor hole. In the present specification, if necessary, a part, of the liner body, which enters the anchor hole is sometimes referred to as anchor portion.

When the anchor portion of the liner body enters the anchor hole of the insert ring, the liner body and the insert ring are firmly integrated. Therefore, in this case, relative position changes between the liner body and the insert ring are reliably suppressed in various directions. Although the internal pressure in directions other than the axial direction such as the radial direction is applied to the liner including the liner body, if relative position changes between the liner body and the insert ring are suppressed in various directions as described above, deterioration of the liner and deterioration of the durability of the high-pressure tank based on the deterioration of the liner are more reliably controlled.

Meanwhile, in the case where the liner body has the dome portion described above, the insert ring suitably has a shape having a diameter increasing along the dome portion, more specifically, a shape having a diameter increasing from the front side toward the rear side in the axial direction. In this case, a rear end portion in the axial direction of the insert ring is a flange portion having the largest diameter of the insert ring and extending toward the outer side in the radial direction.

In the case where the insert ring has such a flange portion, the above-described anchor hole is preferably formed in the flange portion. More specifically, in this case, the anchor hole suitably penetrates the flange portion in the thickness direction thereof.

Since the flange portion extends toward the outer side in the radial direction, the direction of the anchor hole is also considered as a direction intersecting the axial direction.

In this case, the liner body may have an anchor portion entering the anchor hole. In addition, in this case, the liner body and the insert ring are firmly integrated particularly in the axial direction, and a relative position change between the liner body and the insert ring in the axial direction is more reliably suppressed.

As described above, the positions of the liner body and the insert ring easily change in the axial direction with expansion and contraction of the high-pressure tank, so that this embodiment which reliably suppresses a relative position change between the liner body and the insert ring in the axial direction is effective for suppressing deterioration of the liner and deterioration of the durability of the high-pressure tank based on the deterioration of the liner.

As the above-described anchor hole, only one hole may be provided in one insert ring, but a plurality of holes are preferably provided in one insert ring. In the case where a plurality of anchor holes are provided in one insert ring, the respective anchor holes are preferably arranged in the radial direction or the circumferential direction of the insert ring. With this arrangement, a relative position change between the liner body and the insert ring in the axial direction is suppressed over the entirety in the circumferential direction.

Furthermore, in the case where the liner body has a dome portion and the insert ring has a flange portion, the flange portion preferably has a plurality of protrusions protruding radially.

In this case, the liner body may have a meshing portion which enters a gap between the adjacent protrusions. In this case, the liner body and the insert ring are firmly integrated particularly in the circumferential direction and the radial direction. Therefore, according to this embodiment, relative position changes between the liner body and the insert ring in the circumferential direction and the radial direction are more reliably suppressed, and further, deterioration of the liner due to the position change and deterioration of the durability of the high-pressure tank based on the deterioration of the liner are suppressed.

Meanwhile, as described above, the insert ring of the high-pressure tank according to the present invention extends to the front side in the axial direction with respect to the liner body and is mounted on the metal cap. In other words, in the high-pressure tank according to the present invention, the end portion in the axial direction of the liner body is shielded by the insert ring. Since the insert ring is mounted and fixed to the metal cap, even if a force toward the front side in the axial direction is applied to the insert ring when the liner body softens and flows, the insert ring holds the liner body against the force and restricts deformation and position change of the liner body toward the front side in the axial direction.

In order to fully exhibit such a function of restricting deformation and position change of the liner body, the insert ring preferably has a surface which extends in a direction intersecting the axial direction and is in contact with the liner body from the front side in the axial direction. In other words, the surface, of the insert ring, which is in contact with the liner body preferably faces the rear side in the axial direction. If necessary, the surface, of the insert ring, which is in contact with the liner body from the front side in the axial direction is referred to as restriction surface. The restriction surface is also considered as a surface which faces a front end surface in the axial direction of the liner body from the front side in the axial direction.

As described above, the restriction surface preferably faces the rear side in the axial direction, and preferably extends in a direction intersecting the axial direction.

The insert ring having the above restriction surface efficiently inhibits the flow of the liner body toward the front side in the axial direction, and reliably restricts deformation and position change of the liner body toward the front side in the axial direction.

An angle of the restriction surface with respect to the axial direction is preferably an angle close to 90°. Specifically, examples of preferable ranges of the angle of the restriction surface with respect to the axial direction include the range of 20° to 160°, the range of 30° to 150°, the range of 45° to 135°, and the range of 60° to 120°.

In order to more efficiently inhibit the flow of the liner body toward the front side in the axial direction by the restriction surface, the restriction surface is suitably inclined from the rear side in the axial direction and the inner side in the radial direction toward the front side in the axial direction and the outer side in the radial direction. Such a restriction surface covers the front end portion in the axial direction of the liner body in a bag-like shape, thereby further reliably restricting deformation and position change of the liner body toward the front side in the axial direction.

The metal cap is inserted into the opening of the liner body. As the metal cap, a general metal cap for a high-pressure tank may be used, and the material and the shape thereof may be appropriately selected according to the type of the high-pressure fluid contained in the high-pressure tank, etc.

Here, the insert ring is mounted on the metal cap in the high-pressure tank according to the present invention. Therefore, the metal cap and the insert ring preferably have a mounting structure. A method for mounting the insert ring on the metal cap is not particularly limited, and for example, the metal cap may be press-fitted into the insert ring, or the insert ring may be screwed to the metal cap.

The sealing member seals between a peripheral portion of the opening of the liner, that is, an opening peripheral portion, and the metal cap. The sealing member may be in contact with the liner body of the liner, or may be in contact with the insert ring. As such a sealing member, an elastically deformable ring-shaped or tubular member such as an O-ring may be used.

The reinforcing portion covers the outer side of the liner and suppresses expansion of the liner body caused by the tank internal pressure. Similar to the reinforcing portion of a general high-pressure tank, the reinforcing portion may be formed by a general method, for example, by winding high-strength fibers soaked with a fluid resin material around the liner, using a material having excellent pressure resistance and heat resistance such as fiber-reinforced plastic (so-called CFRP or GFRP) using high-strength fibers such as carbon fibers or glass fibers.

Hereinafter, the high-pressure tank according to the present invention is described with specific examples.

First Embodiment

A high-pressure tank according to a first embodiment is a fuel tank that contains hydrogen as fuel and is installed in a vehicle.

Figure 2:
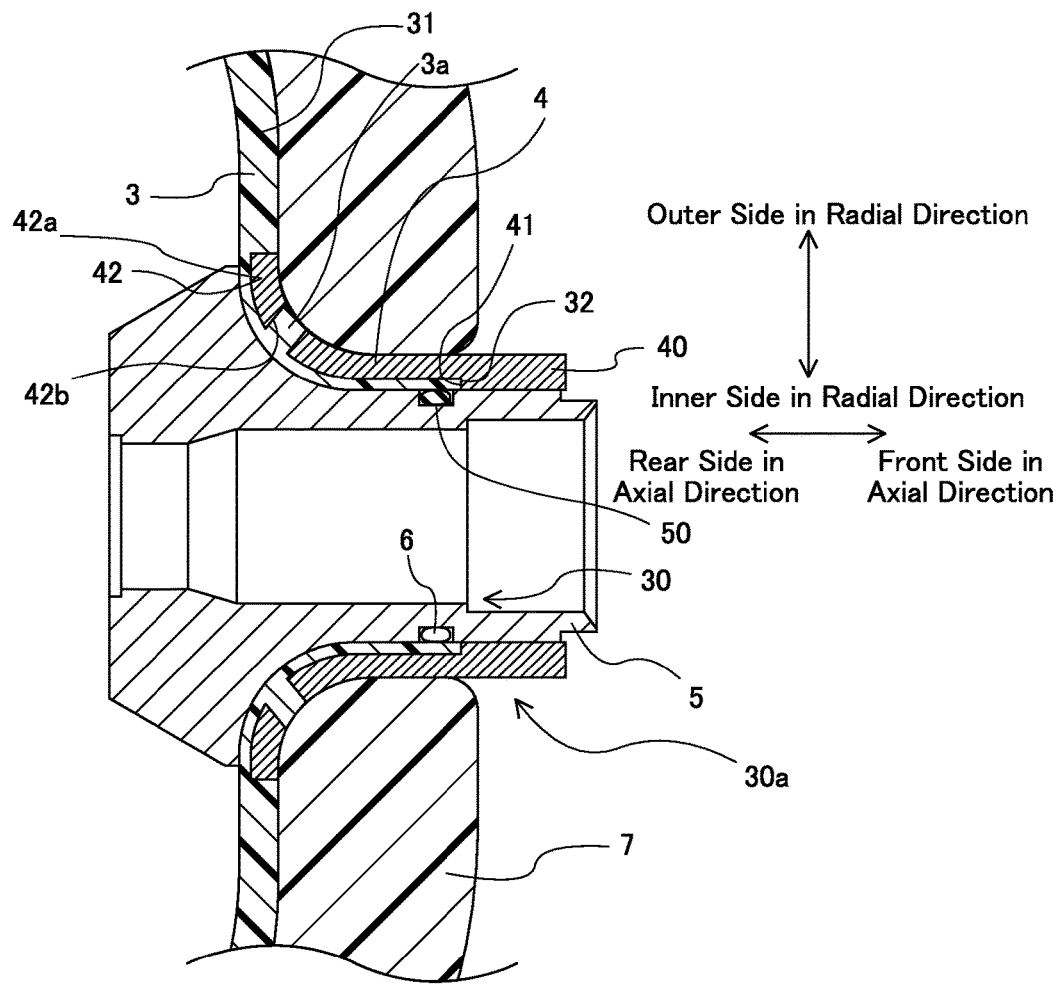
FIG. 2 illustrates an enlarged view of a main part of FIG. 1.
Figure 3:
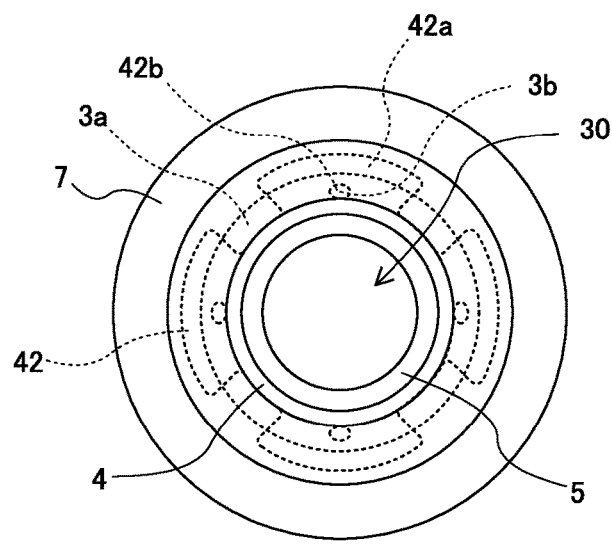
FIG. 3 schematically illustrates a view of a liner and a metal cap in the high-pressure tank according to the first embodiment as seen from a front side in the axial direction.

FIG. 1 schematically illustrates a cross-sectional view of the high-pressure tank according to the first embodiment taken along an axial direction thereof. FIG. 2 is an enlarged view of a main part of the high-pressure tank shown in FIG. 1. FIG. 3 schematically illustrates a view of the high-pressure tank according to the first embodiment as seen from a front side in the axial direction.

In this embodiment, the axial direction and the radial direction refer to the axial direction and the radial direction shown in each drawing.

As shown in FIG. 1, a high-pressure tank 1 according to the first embodiment includes a liner 2, metal caps 5, sealing members 6, and a reinforcing portion 7.

The liner 2 has a liner body 3 and insert rings 4.

The liner body 3 is made of nylon 6 and has a substantially cylindrical shape having an opening 30 in each of both end portions in the axial direction. The inside of the liner body 3 is a containing space for containing hydrogen which is a high-pressure fluid.

Each of dome portions 31 which are both end portions in the axial direction of the liner body 3 has a dome shape having a diameter increasing from the front side toward the rear side in the axial direction. Each dome portion 31 is also considered to have a diameter decreasing from the rear side toward the front side in the axial direction. The surface of the dome portion 31 has a curved shape having a substantially constant curvature.

The opening 30 of the liner body 3 is located at a center portion of each dome portion 31.

As shown in FIG. 1 and FIG. 2, a peripheral portion of the opening 30, that is, an opening peripheral portion 30a, has a substantially cylindrical shape extending from the rear side toward the front side in the axial direction.

One insert ring 4 is integrated into each of the two openings 30 of the liner body 3, and one metal cap 5 is mounted in each of the two openings 30 of the liner body 3.

The insert ring 4 is made of SUS316L, has a short tubular shape extending coaxially with the liner body 3, and is harder than the liner body 3. The insert ring 4 is integrally molded with the liner body 3 by an insert molding method and surrounds the opening 30.

More specifically, as shown in FIG. 2, a front side restriction end portion 40 which is a front side portion in the axial direction of the insert ring 4 protrudes inward in the radial direction. The front side restriction end portion 40 has, at a rear end portion in the axial direction thereof, an end surface facing the rear side in the axial direction. This end surface is referred to as restriction surface 41. The restriction surface 41 extends in the radial direction of the liner body 3, that is, a direction orthogonal to the axial direction of the liner body 3, and faces a front end surface 32 in the axial direction of the liner body 3 from the front side in the axial direction. As described later, the front side restriction end portion 40 of the insert ring 4 is mounted on the metal cap 5.

A rear side portion in the axial direction of the insert ring 4 has a shape having a diameter increasing along the dome portion 31. A flange portion 42 which is a rear end portion in the axial direction of the insert ring 4 has the largest diameter of the insert ring 4 and extends toward the outer side in the radial direction.

As shown in FIG. 3, the flange portion 42 has four protrusions 42a and four anchor holes 42b. The respective protrusions 42a arranged are substantially evenly in the circumferential direction of the insert ring 4. The respective anchor holes 42b are arranged at substantially the same positions as the respective protrusions 42a in the circumferential direction of the insert ring 4.

Each anchor hole 42b penetrates the flange portion 42 in the thickness direction thereof. The anchor hole 42b extends so as to intersect the axial direction at about 45°.

An anchor portion 3b which is a part of the liner body 3 enters each anchor hole 42b. In addition, a meshing portion 3a which is a part of the liner body 3 enters a gap between the adjacent protrusions 42a.

The metal caps 5 are made of SUS316L, and are inserted into the two openings 30 of the liner body 3, respectively.

The outer diameter of a front side portion in the axial direction of each metal cap 5 is slightly larger than the inner diameter of the front side restriction end portion 40 of the insert ring 4. Therefore, the metal cap 5 is press-fitted into the insert ring 4, and the front side restriction end portion 40 of the insert ring 4 is mounted on the metal cap 5.

As shown in FIG. 2, an annular groove 50 is formed on the metal cap 5. The groove 50 is open toward the outer side in the radial direction of the metal cap 5. The sealing member 6 is mounted in the groove 50.

The sealing member 6 is an O-ring made of rubber, is mounted in the groove 50 as described above, and seals between an end portion of the liner body 3 on the front side in the axial direction and the metal cap 5.

The reinforcing portion 7 is made of fiber-reinforced plastic, and covers the outer side of the liner 2 as shown in FIG. 1 and FIG. 2.

As shown in FIG. 2, in the high-pressure tank 1 according to the first embodiment, the front side in the axial direction of the liner body 3 is shielded by the insert ring 4. Therefore, the liner body 3 that is exposed to high temperature and high pressure, softens, and tends to flow to the front side in the axial direction is blocked by the insert ring 4. In addition, since the insert ring 4 is mounted on the metal cap 5, even if a force toward the axial direction by the liner body 3 is applied to the insert ring 4, the position of the insert ring 4 is less likely to change.

Accordingly, in the high-pressure tank 1 according to the first embodiment, excessive deformation and position change of the liner body 3 toward the front side in the axial direction is reliably suppressed, and deformation and breakage of the entire liner 2 is also reliably suppressed.

Furthermore, in the high-pressure tank 1 according to the first embodiment, since the flange portion 42 of the insert ring 4 has the protrusions 42a and the anchor holes 42b, relative position changes between the insert ring 4 and the liner body 3 in the axial direction, the radial direction, and the circumferential direction are more reliably suppressed. Also, owing to this, in the high-pressure tank 1 according to the first embodiment, deformation and breakage of the entire liner 2 is reliably suppressed.

Second Embodiment

A high-pressure tank according to a second embodiment is substantially the same as the high-pressure tank according to the first embodiment except for the shape of the front end portion in the axial direction of the liner. Therefore, the high-pressure tank according to the second embodiment is described below focusing on the differences from the first embodiment.

Figure 4:
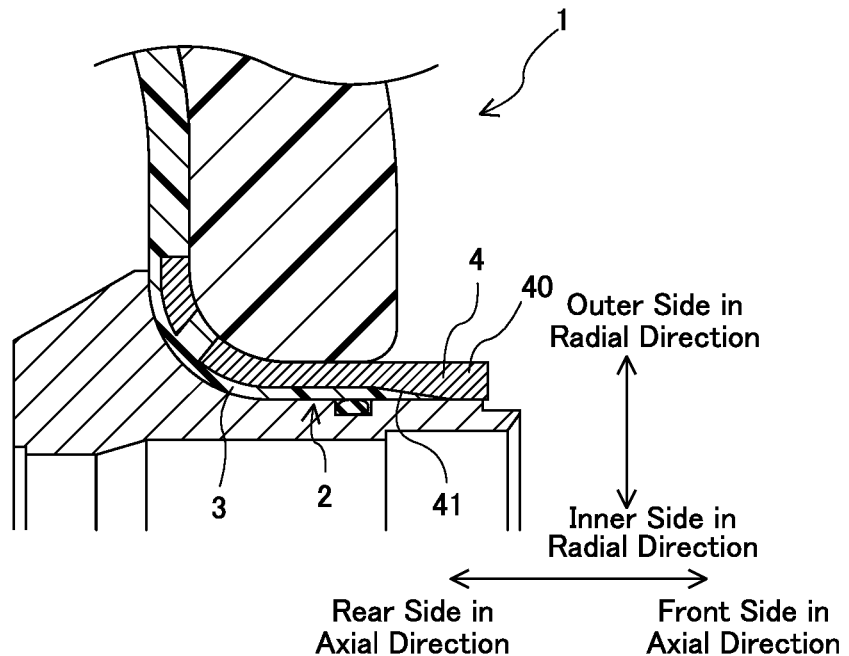
FIG. 4 illustrates an enlarged view of a main part of a high-pressure tank according to a second embodiment.

FIG. 4 illustrates a main part of the high-pressure tank according to the second embodiment.

As shown in FIG. 4, in a high-pressure tank 1 according to the second embodiment, the restriction surface 41 of the insert ring 4 has an inclined shape intersecting the radial direction and the axial direction of the liner body 3. More specifically, the restriction surface 41 is inclined from the rear side in the axial direction and the outer side in the radial direction toward the front side in the axial direction and the inner side in the radial direction, and an angle of the restriction surface 41 with respect to the axial direction is not larger than 20°.

However, even if the insert ring 4 has such a restriction surface 41, the front side restriction end portion 40 thereof protrudes inward in the radial direction on the front side in the axial direction of the liner body 3. Therefore, the front end portion in the axial direction of the liner body 3 is shielded by the front side restriction end portion 40 of the insert ring 4. Accordingly, in the high-pressure tank 1 according to the second embodiment as well, excessive deformation and position change of the liner body 3 toward the front side in the axial direction is sufficiently suppressed, and deformation and breakage of the entire liner 2 is also sufficiently suppressed.

Third Embodiment

A high-pressure tank according to a third embodiment is substantially the same as the high-pressure tank according to the first embodiment except for the shape of the front end portion in the axial direction of the liner. Therefore, the high-pressure tank according to the third embodiment is described below focusing on the differences from the first embodiment.

Figure 5:
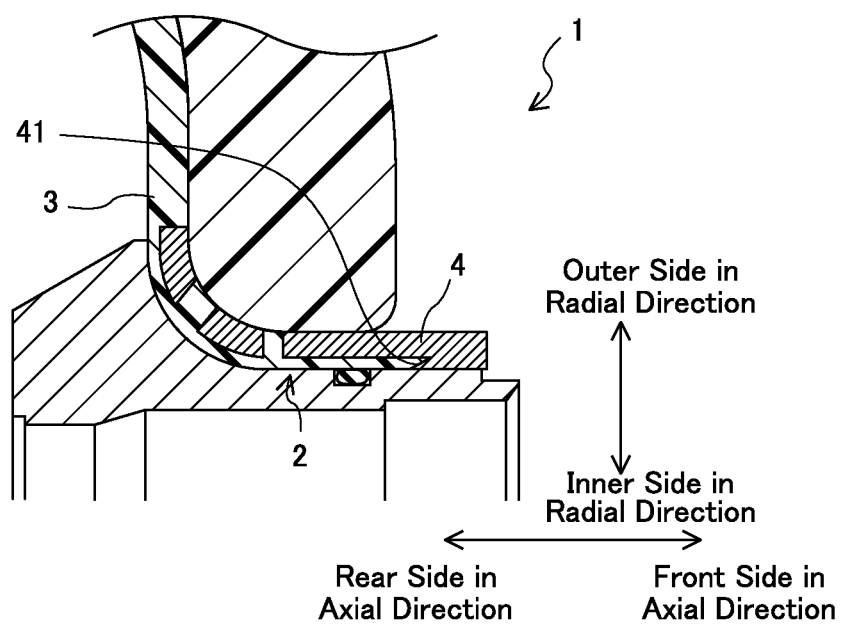
FIG. 5 illustrates an enlarged view of a main part of a high-pressure tank according to a third embodiment.

FIG. 5 illustrates a main part of the high-pressure tank according to the third embodiment.

As shown in FIG. 5, in a high-pressure tank 1 according to the third embodiment, the restriction surface 41 of the insert ring 4 has an inclined shape intersecting the radial direction and the axial direction of the liner body 3. More specifically, the restriction surface 41 in the high-pressure tank 1 according to the third embodiment is inclined from the rear side in the axial direction and the inner side in the radial direction toward the front side in the axial direction and the outer side in the radial direction.

Therefore, the restriction surface 41 of the insert ring 4 in the high-pressure tank 1 according to the third embodiment covers the front end portion in the axial direction of the liner body 3 in a bag-like shape, and more reliably restricts deformation and position change of the liner body 3 toward the front side in the axial direction. Accordingly, in the high-pressure tank 1 according to the third embodiment, excessive deformation and position change of the liner body 3 toward the front side in the axial direction is reliably suppressed, and further, deformation and breakage of the entire liner 2 is also reliably suppressed.

The present invention is not limited to the embodiments described above and shown in the drawings, but may be modified as appropriate without deviating from the gist of the present invention. Furthermore, components described in the present specification including the embodiments may be optionally extracted and combined to be implemented.

The invention claimed is:
1. A high-pressure tank comprising:
a liner having a hollow liner body having an opening in an end portion in an axial direction, and a tubular insert ring harder than the liner body and integrated with the liner body to surround the opening;
a metal cap inserted into the opening;
a sealing member sealing between an opening peripheral portion of the liner and the metal cap; and a reinforcing portion covering an outer side of the liner, wherein the insert ring extends to a front side in the axial direction with respect to the liner body and is mounted on the metal cap, wherein a dome portion which is a front end portion in the axial direction of the liner body has a dome shape having a diameter increasing from the front side toward a rear side in the axial direction, a flange portion which is a rear end portion in the axial direction of the insert ring has a diameter increasing along the dome portion, and has an anchor hole penetrating the flange portion in a thickness direction thereof, and the liner body has an anchor portion entering the anchor hole.

2. The high-pressure tank according to claim 1, wherein the insert ring has a restriction surface facing a rear side in the axial direction, and a front end surface in the axial direction of the liner body faces the restriction surface.

3. A high-pressure tank comprising:

a liner having a hollow liner body having an opening in an end portion in an axial direction, and a tubular insert ring harder than the liner body and integrated with the liner body to surround the opening;

a metal cap inserted into the opening;

a sealing member sealing between an opening peripheral portion of the liner and the metal cap; and a reinforcing portion covering an outer side of the liner, wherein the insert ring extends to a front side in the axial direction with respect to the liner body and is mounted on the metal cap, wherein a dome portion which is a front end portion in the axial direction of the liner body has a dome shape having a diameter increasing from the front side toward a rear side in the axial direction, a flange portion which is a rear end portion in the axial direction of the insert ring has a diameter increasing along the dome portion, and has a plurality of protrusions protruding radially, and the liner body has a meshing portion entering a gap between the adjacent protrusions.

4. The high-pressure tank according to claim 3, wherein the insert ring has a restriction surface facing a rear side in the axial direction, and a front end surface in the axial direction of the liner body faces the restriction surface.

* * * * *